United States Patent
Harris et al.

(10) Patent No.: US 6,345,871 B1
(45) Date of Patent: Feb. 12, 2002

(54) PEDAL TRAVEL LIMITATION IN ELECTRO-HYDRAULIC (EHB) BRAKING SYSTEMS

(76) Inventors: Alan Leslie Harris, 24 Malvern Road, Balsall Common, Conventry (GB); Karl-Friedrich Wörsdorfer, Schillerstrasse 32, 55257 Budenheim (DE)

(*) Notice: Subject to any disclaimer, the term of this patent is extended or adjusted under 35 U.S.C. 154(b) by 0 days.

(21) Appl. No.: 09/448,119

(22) Filed: Nov. 24, 1999

(30) Foreign Application Priority Data

Nov. 27, 1998 (GB) .............................. 9825890

(51) Int. Cl.[7] ................................. B60T 8/60
(52) U.S. Cl. ................. 303/155; 303/113.4; 303/15
(58) Field of Search .............. 303/155, 113.4, 303/DIG. 3, DIG. 4, 3, 15

(56) References Cited

U.S. PATENT DOCUMENTS

| | | | | |
|---|---|---|---|---|
| 5,261,730 A | * | 11/1993 | Steiner et al. | 303/113.4 |
| 5,588,718 A | * | 12/1996 | Winner et al. | 303/113.4 |
| 5,887,954 A | * | 3/1999 | Steiner et al. | 303/113.4 |
| 5,941,608 A | | 8/1999 | Campau et al. | 303/113.4 |
| 5,979,999 A | | 11/1999 | Poertzgen et al. | 303/116.1 |
| 6,158,825 A | * | 12/2000 | Schunck et al. | 303/115.4 |
| 6,213,572 B1 | * | 4/2001 | Linkner, Jr. et al. | 303/155 |
| 6,226,586 B1 | * | 5/2001 | Luckevich et al. | 303/155 |

FOREIGN PATENT DOCUMENTS

| | | | |
|---|---|---|---|
| DE | 3131856 A | * | 2/1983 |
| WO | WO93/00236 | | 7/1993 |

* cited by examiner

Primary Examiner—Robert J. Oberleitner
Assistant Examiner—Marlano Sy
(74) Attorney, Agent, or Firm—MacMillan, Sobanski & Todd, LLC

(57) ABSTRACT

An electro-hydraulic braking system of the type capable of operating in a braking-by-wire mode wherein hydraulic pressure is applied to braking devices at the vehicle wheels in proportion to the driver's braking demand as sensed electronically at a brake pedal, in a push-through mode wherein hydraulic pressure is applied to the braking devices at the vehicle wheels by way of a master cylinder coupled mechanically to the brake pedal and in an ABS mode in which the braking pressures at the individual wheels are controlled in dependence, inter alia, on the detected rotational behavior of the vehicle wheels, and which includes a hydraulic travel simulator which is connected hydraulically to the master cylinder by way of an electrically controlled isolation valve for providing improved feel for the driver through the brake pedal in the push-through operating mode. In order to ensure that the brake pedal cannot be pushed beyond a position corresponding to a wheel-locking pressure, and thereby make it easier for the driver to modulate the brake pressure and avoid excessive deceleration if the road adhesion improves, the travel simulator isolation valve is arranged to be closed when the ABS mode is active.

8 Claims, 3 Drawing Sheets

PEDAL TRAVEL LIMITATION IN ELECTRO-HYDRAULIC (EHB) BRAKING SYSTEMS

CROSS-REFERENCE TO RELATED APPLICATIONS

This application claims priority to co-pending United Kingdom Patent Application No. 9825890.8

BACKGROUND OF THE INVENTION

The present invention is concerned with the limitation of brake pedal travel within the context of electro-hydraulic (EHB) braking systems during ABS braking.

A typical EHB system for a vehicle comprises a brake pedal, respective braking devices connected to the vehicle wheels and which are capable of being brought into communication with electronically controlled proportional control valves in order to apply hydraulic fluid under pressure to the braking devices, a hydraulic pump driven by an electric motor, and a high pressure hydraulic pressure accumulator fed by said pump for the provision of hydraulic fluid under pressure which can be passed to the braking devices via the proportional control valves in order to apply hydraulic fluid under pressure to the braking devices in so called "brake by wire" mode in proportion to the driver's braking demand as sensed at the brake pedal. The EHB system is controlled by an electronic controller (ECU).

In order to make the EHB system "feel" like a conventional braking system in a so-called "push-through" mode of braking in the event of failure of the brake-by-wire mode, a travel simulator is also provided which is connected hydraulically to a master cylinder coupled to the brake pedal and which allows, by increasing the volume under pressure, the brake pedal to be depressed to an extent comparable with that of conventional systems. In some known systems, the travel simulator may be isolated during this mode of braking by the closure of an electrically operated valve in order to reduce the pedal travel required to apply the desired braking pressure.

Known systems have the problem that, with brake-by-wire not operative due to failure, when the pressure applied to the wheel brakes ceases to be controlled as a function of master-cylinder pressure and pedal travel, ie when vehicle dynamic intervention such as ABS is active, the driver may still depress the brake pedal beyond the point at which travel and master cylinder pressure correspond to the applied braking pressure. This makes it difficult for the driver to modulate braking demand around the level at which ABS is activated.

Furthermore, when road conditions change and adhesion improves such that ABS is no longer required, the applied braking pressure reverts to its dependence upon master-cylinder pressure and pedal travel which, in the worst case, may be at their limit due to the driver's wish to decelerate at a greater rate. The sudden increase in demand results in excessive deceleration and further difficulty in modulating braking pressure smoothly.

It is an object of the present invention to provide a braking system which alleviates the abovementioned problems with known systems without substantially adding to the complexity and/or cost of the braking system and without compromising safety.

In accordance with the present invention, the travel simulator isolation valve is arranged to be closed when the ABS mode is active.

During ABS activity, the brake pedal will then be unable to be pushed beyond a position corresponding to a wheel-locking pressure, thereby making it easier for the driver to modulate the brake pressure and avoid excessive deceleration if the road adhesion improves.

Preferably, closure of the travel simulator isolation valve is arranged to be delayed until at least two of the vehicle wheels are under ABS control.

Advantageously, when the travel simulator isolation valve first closes, the master cylinder pressure is arranged to be memorized, the memorized value being used subsequently to control re-opening of the valve.

Preferably, the valve is arranged to remain closed until either the master cylinder pressure falls below the memorized pressure, or until less than two wheels remain under ABS control.

The invention is described further hereinafter, by way of example only, with reference to the accompanying drawings.

DETAILED DESCRIPTION OF THE INVENTION

Figure 1:
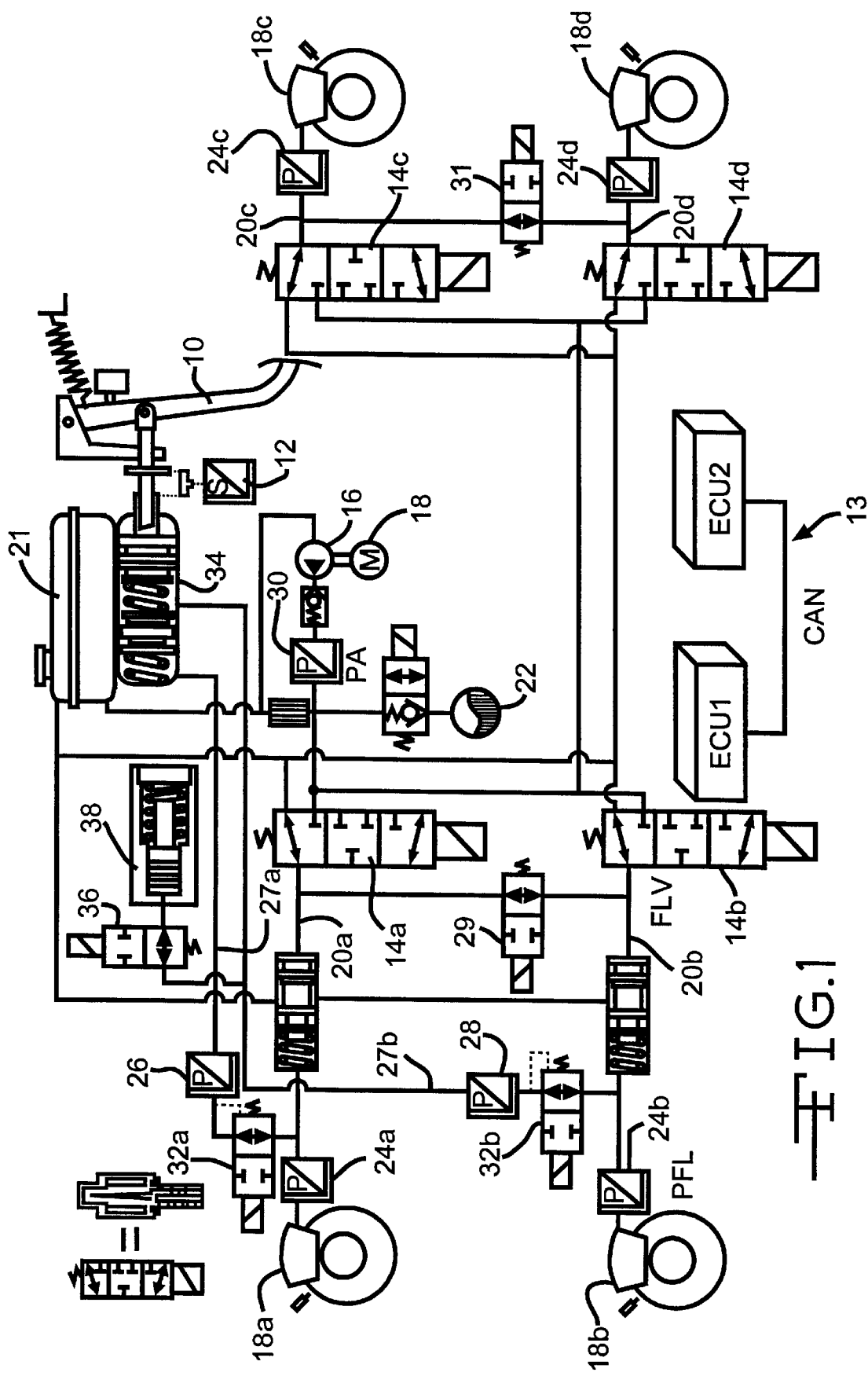
FIG. 1 is a schematic illustration of one embodiment of an electro-hydraulic braking system to which the present invention is applicable.

Referring first to FIG. 1, the illustrated EHB system comprises a brake pedal 10 with an associated sensor 12 for the acquisition of the driver's braking demand. The driver's demand is transferred to an electronic control unit (ECU) 13, evaluated there, and used as the source for the generation of electrical control signals for proportional solenoid control valves 14a, 14b, 14c, 14d, a hydraulic pump 16, wheel brakes 18a, 18b of one axle supplied with hydraulic fluid by electrically actuated brake channels 20a, 20b and wheel brakes 18c, 18d of the other axle supplied by electrically actuated channels 20c, 20d Hydraulic fluid for the system is stored in a reservoir 21.

Under normal braking conditions, brake pressure modulation in the electrically actuated brake channels 20a, 20b, 20c, 20d is effected in a known manner by means of the proportional solenoid control valves 14a, 14b, 14c and 14d, the brake pressure being provided by a pressure accumulator/reservoir 22 whose pressure is maintained by the pump 16 operated by an electric motor 18.

When road conditions demand, the ECU initiates ABS braking wherein, in accordance with well known principles, the braking pressures at the individual wheels are controlled in dependence, amongst other things, on the detected rotational behaviour of the vehicle wheels.

Pressure sensors 24a and 24b monitor the hydraulic pressure at the wheel brakes 18a, 18b of the front axle and pressure sensors 24c and 24d monitor the hydraulic pressure at the wheel brakes 18c, 18d of the rear axle. Further pressure sensors 26,28 monitor the pressure within push-through circuits 27a, 27b for the right and left front wheel brakes and a pressure sensor 30 monitors the supply pressure in the circuit of pump 16. Respective solenoids 29 and 31 enable the brake channels 20a, 20b and 20c, 20d to be coupled together.

The push-through circuits 27a, 27b include respective solenoid controlled valves 32a, 32b to enable these circuits to be closed (open-circuited) during normal brake-by-wire operation.

The push-through arrangement includes a master-cylinder 34 coupled to the brake pedal 10 and to the circuits 27a, 27b, the master cylinder enabling the front brakes to be actuated manually in the event of failure of the brake-by-wire system. Coupled to the circuit 27b via a solenoid operated valve 36 is a travel simulator 38 which is activated hydraulically by master-cylinder pressure to give "feel" to the driver during push-through operation of the brakes. The connection between the master cylinder 34 and the travel simulator 38 is controllable by the electrically operated valve 36, so that unnecessary pedal travel can be avoided during manual actuation by closure of this valve.

The system described this far is already known. Conventionally, it has been the practice to arrange for the travel simulator isolation valve 36 to be open when ABS is operating. However, it is now proposed that it is arranged for the travel simulator isolation valve 36 to be closed when ABS is operating. During ABS activity, the pedal 10 will then stay at the position corresponding to the wheel-locking pressure, making is easier for the driver to modulate the brake pressure and avoid excessive deceleration if the road adhesion improves.

Although the valve 36 could be closed at the time when ABS first begins to operate, it is usually preferred to delay closure until at least two wheels are under ABS control. When the valve 36 first closes, the master-cylinder pressure should preferably be memorised, so that the memorised value can be used to control re-opening of the valve. The valve 36 should remain closed until either the master cylinder pressure falls below the memorised pressure, or until less than two wheels remain under ABS control.

Figure 2:
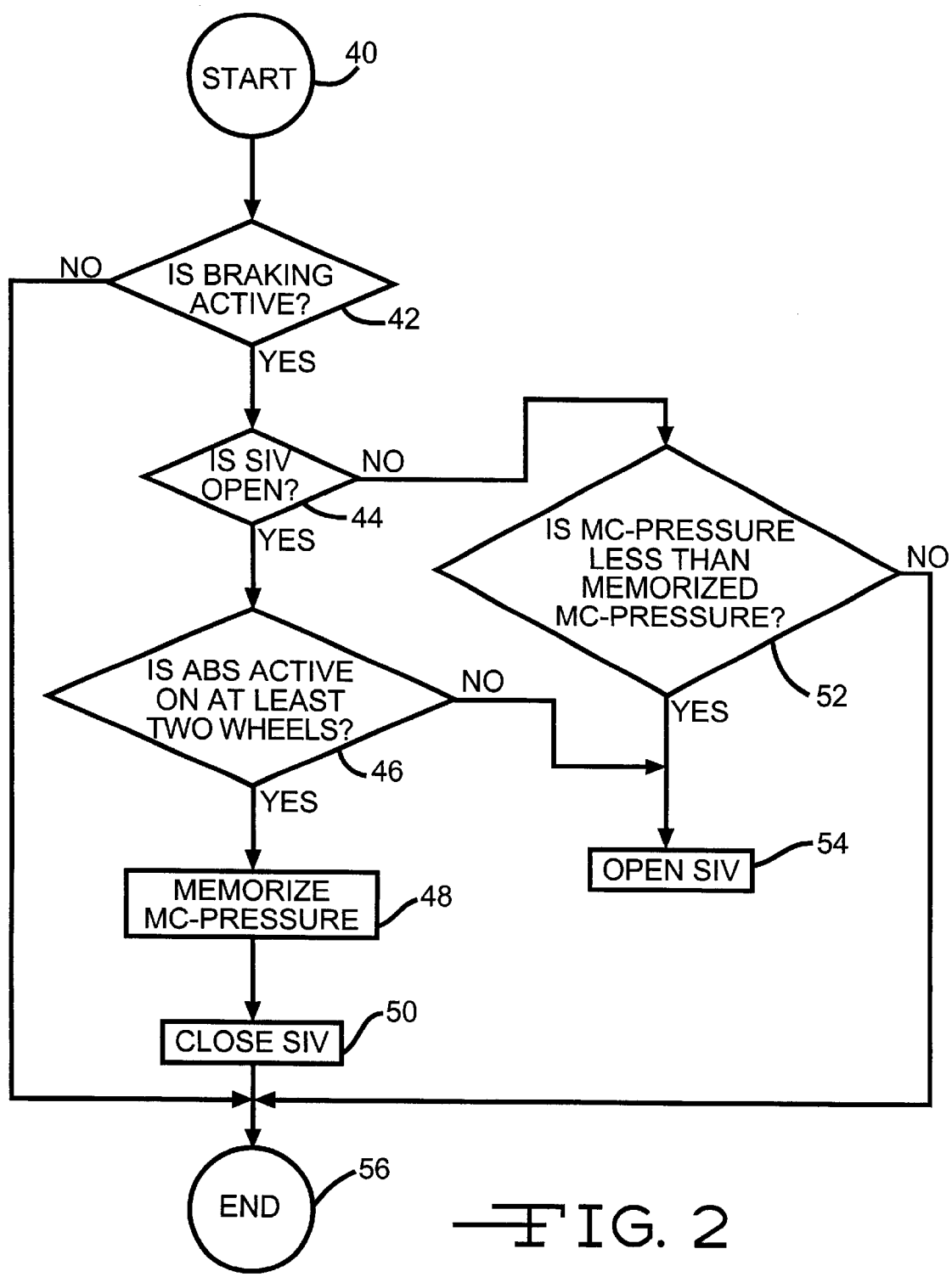
FIG. 2 is a sequence flow diagram illustrating one routine for the operation of an embodiment in accordance with the present invention.

FIG. 2 shows a flow-chart illustrating a routine for the operation of an embodiment of the invention. The routine is executed once per program cycle.

The routine of FIG. 2 includes the following sequence steps:

40—START

42—Is braking active?

44—Is simulator isolation valve SIV open?

46—Is ABS active on at least two wheels?

48—Memorise master cylinder MC—pressure 48

50—Close SIV.

52—Is MC—pressure less than memorised MC—pressure?

54—Open SIV.

56—END

The routine of FIG. 2 first checks if braking is active. If it is not, the routine is terminated. If braking is active the position of the simulator isolation valve (SIV) 36 is checked. In the event that the SIV is open a check is made to see if at least two wheels are under ABS control. If they are, then the actual master cylinder (MC) pressure is memorised and the SIV 36 is closed. In the event that at least two wheels are not under ABS control the SIV is opened and the routine is terminated. In the event that braking is active and the SIV is not open (i.e. it is closed), the actual master cylinder pressure is compared with the memorised MC—pressure. If the actual MC—pressure is less than the memorised MC—pressure, which means that the driver has backed off his pedal actuation, then the SIV is opened and the routine is terminated.

Figure 3:
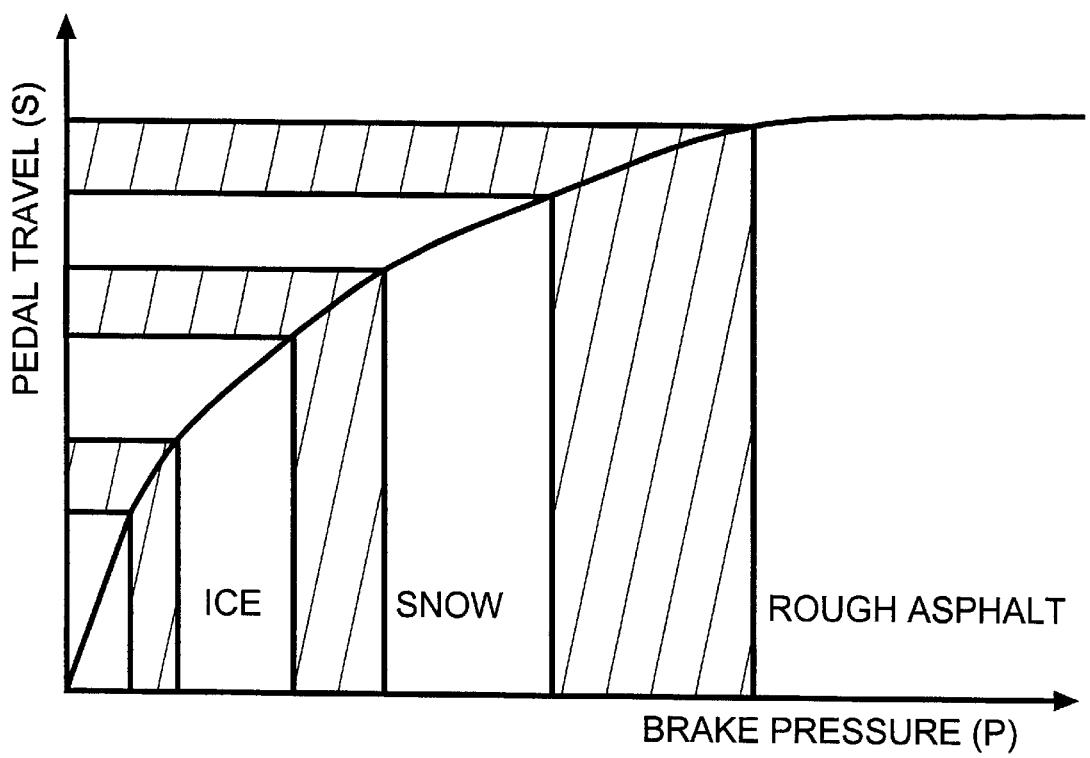
FIG. 3 shows an example of typical pedal travel v. braking pressure characteristics for three different road surface friction coefficients.

In FIG. 3 the dependence of the pedal travel to brake pressure (s/f) characteristics from the condition of the road surface is shown for three different friction coefficients (ICE, SNOW, ROUGH ROAD). From this it follows that the lower is the friction coefficient, the lower are the locking pressure and the corresponding pedal travel and vice versa.

What is claimed is:

1. An electro-hydraulic braking system of the type capable of operating in a brake-by-wire mode wherein hydraulic pressure is applied to braking devices at the vehicle wheels in proportion to the driver's braking demand as sensed electronically at a brake pedal, in push-through mode wherein hydraulic pressure is applied to the braking devices at the vehicle wheels by way of a master cylinder coupled mechanically to the brake pedal and also in an ABS mode in which the braking pressures at the individual wheels are controlled in dependence, inter alia, on the detected rotational behaviour of the vehicle wheels, and which includes a hydraulic travel simulator which is connected hydraulically to said master cylinder by way of an electrically controlled isolation valve for providing improved feel for the driver through the brake pedal in the push-through operating mode, wherein the travel simulator isolation valve is arranged to be closed when the ABS mode is active.

2. A system according to claim 1, wherein closure of the travel simulator isolation valve is arranged to be delayed until at least two of the vehicle wheels are under ABS control.

3. A system according to claim 1, wherein when the travel simulator isolation valve first closes, the master cylinder pressure is memorised, the memorised value being used subsequently to control re-opening of the valve.

4. A system according to claim 2, wherein when the travel simulator isolation valve first closes, the master cylinder pressure is memorised, the memorised value being used subsequently to control re-opening of the valve.

5. A system according to claim 3, wherein the valve is arranged to remain closed until one of the master cylinder pressure falls below the memorised pressure and less than two wheels remain under ABS control.

6. A system according to claim 4, wherein the valve is arranged to remain closed until one of the master cylinder pressure falls below the memorised pressure and less than two wheels remain under ABS control.

7. An electro-hydraulic braking system of the type capable of operating:

in a brake-by-wire mode wherein hydraulic pressure is applied to braking devices at the vehicle wheels in proportion to the driver's braking demand as sensed electronically at a brake pedal;

in a push-through mode wherein hydraulic pressure is applied to the braking devices at the vehicle wheels by way of a master cylinder coupled mechanically to the brake pedal; and also in an ABS mode in which the braking pressures at the individual wheels are controlled at least in dependence on the detected rotational behaviour of the vehicle wheels;

and which includes a hydraulic travel simulator which is connected hydraulically to said master cylinder by way of an electrically controlled isolation valve for providing improved feel for the driver through the brake pedal in the push-through operating mode, wherein the travel simulator isolation valve is arranged to be closed when the ABS mode is active.

8. An electro-hydraulic brake system comprising:

a braking device at a wheel of a vehicle;

a master cylinder adapted to selectively supply hydraulic fluid to the braking device;

a brake pedal mechanically coupled to the master cylinder;

a first sensor electronically sensing a driver's braking demand during operation of the brake pedal;

a second sensor detecting rotational behavior of the vehicle wheel;

a hydraulic travel simulator connectable hydraulically to the master cylinder; and a valve for selectively hydraulically isolating the hydraulic travel simulator from the master cylinder;

the brake system being operable in at least three modes of operation, including:

a first mode wherein hydraulic pressure is applied to the braking device at the vehicle wheel in proportion to the driver's braking demand as sensed by the first sensor;

a second mode wherein hydraulic pressure is applied to the braking device at the vehicle wheel by way of the master cylinder operated mechanically by the brake pedal, the valve permitting the hydraulic travel simulator to communicate hydraulically with the master cylinder for providing an improved pedal feel for the driver through the brake pedal in the second mode; and a third mode wherein the hydraulic pressure applied to the braking device at the vehicle wheel is controlled at least upon the rotational behavior of the wheel sensed by the second sensor, the hydraulic travel simulator being isolated from the master cylinder by the valve in the third mode of operation of the brake system.

* * * * *